Patented June 30, 1942

2,288,190

UNITED STATES PATENT OFFICE 2,288,190

METHOD OF MAKING SPONGE RUBBER

Marion M. Harrison, Akron, Ohio, assignor to The B. F. Goodrich Company, New York, N. Y., a corporation of New York No Drawing. Application January 25, 1940, Serial No. 315,623

3 Claims. (Cl. 260—723)

This invention relates to a method of making sponge rubber from an aqueous dispersion of rubber, such as natural rubber latex.

It is the purpose of this invention to produce a sponge rubber from latex in which the cells of the sponge are formed by means of an inert gas, namely, propane. According to a preferred method of this invention the latex composition is subjected to propane gas under such conditions of temperature and pressure that the gas has less volume than it would ordinarily have at atmospheric pressure and normal room temperature. This procedure causes the propane to dissolve in or be absorbed by the latex. For simplicity, it will be considered that the propane is truly dissolved in the latex, it being understood, however, that terms implying solution include absorption, adsorption and other phenomena which may enter into the association of the propane with the latex. After holding the above conditions for a time sufficient to dissolve an appreciable amount of the inert propane gas, the conditions of temperature and/or pressure are changed so as to reduce the solubility of the propane. The change in solubility is brought about by either lowering the pressure, raising the temperature, or both. This reduction in solubility causes the propane gas to form in small cells throughout the latex thereby resulting in an expanded but still flowable latex composition. The expanded latex is then converted into the desired shape by pouring into molds, spreading on a base, or otherwise shaping it. The expanded latex is then set to an irreversible gel thereupon forming a porous rubber structure. After the expanded latex is coagulated it may be vulcanized.

It has heretofore been generally considered that to use a gas in making sponge rubber from latex the gas should be of a relatively high solubility in latex. I have found, however, that a gas of lesser solubility produces a better sponge. The propane gas used in this invention is less soluble than the ordinary gases, such as carbon dioxide and nitrous oxide, formerly used in making sponge from latex. This lesser solubility leads to the formation of a sponge with smaller, more evenly sized bubbles or cells and results in an improved sponge. It is also true that many of the prior gases, such as carbon dioxide, tend to coagulate latex and so cause premature coagulation when used in sponge-making processes. This difficulty is not encountered with the propane gas employed in the present invention.

The compounded latex used in this invention preferably should contain a stabilizing agent such as soap, a delayed coagulant, and vulcanizing materials, in addition to any other desired compounding ingredients, all of which is well understood in the art.

One embodiment of this invention is to subject latex in an enclosed tank to propane gas under pressure until the latex is substantially saturated with the gas. Ordinarily, this will require not more than ten to twenty minutes although longer times may be required to saturate large volumes of latex. After the latex is saturated with the gas the pressure is suddenly released causing the propane to flash out of solution thereby forming minute bubbles throughout the latex. The resulting expanded latex can be molded, spread on a cloth or other material, or similarly handled.

The charging of the latex with the propane gas of this invention has been carried out at various gas pressures ranging from 25 to 100 lbs. per sq. in. but for practical purposes the pressure need not exceed 60 or 65 lbs. per sq. in., although lower pressures can be used. The temperature also may be varied with the pressure. For instance, during charging the latex with gas under pressure the temperature may be lowered to any point just above liquification of the gas and then prior to release of the pressure the temperature may be raised. It is also possible to charge the latex by lowering the temperature and keeping the pressure constant. The expanded latex is formed by suddenly raising the temperature, thereby releasing the gas from solution and forming the small bubbles or cells.

The term "aqueous dispersion of a rubber material" appearing in the claims is used broadly to designate any naturally occurring or artificially prepared dispersion of natural or synthetic rubber including specifically caoutchouc, gutta percha, balata, Neoprene, Thiokol, and poly isobutylene, dispersed in an aqueous dispersion medium. Such dispersions may be concentrated, diluted, thickened, thinned or otherwise prepared for use and may contain any of the usual stabilizing, creaming, vulcanizing, compounding or other conditioning agents ordinarily employed in rubber dispersions, particularly in the manufacture of sponge rubber. An aqueous dispersion of a rubber material that has been prevulcanized or partly prevulcanized may be used in this invention.

The term "sponge rubber" has been used in a generic sense to include porous rubber products in general, whether alone or associated with other materials.

Many modifications and changes in the procedures described may be employed in practicing this invention without departing from the spirit and scope of the appended claims.

I claim:

1. The method of making sponge rubber which comprises dissolving propane in an aqueous dispersion of a rubber material, the solution being effected under such conditions of temperature and pressure that the propane occupies a smaller volume than it would ordinarily occupy at normal room temperature and atmospheric pressure, then altering at least one condition of temperature or pressure in order to deposit the propane from solution in the form of small bubbles, to produce an expanded structure, and thereafter setting the expanded structure to an irreversible condition.

2. The method of making sponge rubber which comprises subjecting an aqueous dispersion of a rubber material in a closed container to gaseous propane under substantial pressure and for a time sufficient to associate a substantial quantity of the propane with the dispersion, and thereafter lowering the pressure whereby the dispersion is expanded to a porous state.

3. The method of making a sponge or porous rubber product which comprises adding propane to an aqueous dispersion of a rubber material under conditions inhibiting expansion of the mixture, altering the conditions to bring about expansion of the mixture to a porous state, and then setting the expanded mixture to an irreversible condition.

MARION M. HARRISON.